Nov. 17, 1970   R. E. POST ET AL   3,540,275
METHOD AND APPARATUS FOR MEASURING LIQUID VOLUME IN A TANK
Filed Feb. 28, 1968   3 Sheets-Sheet 3
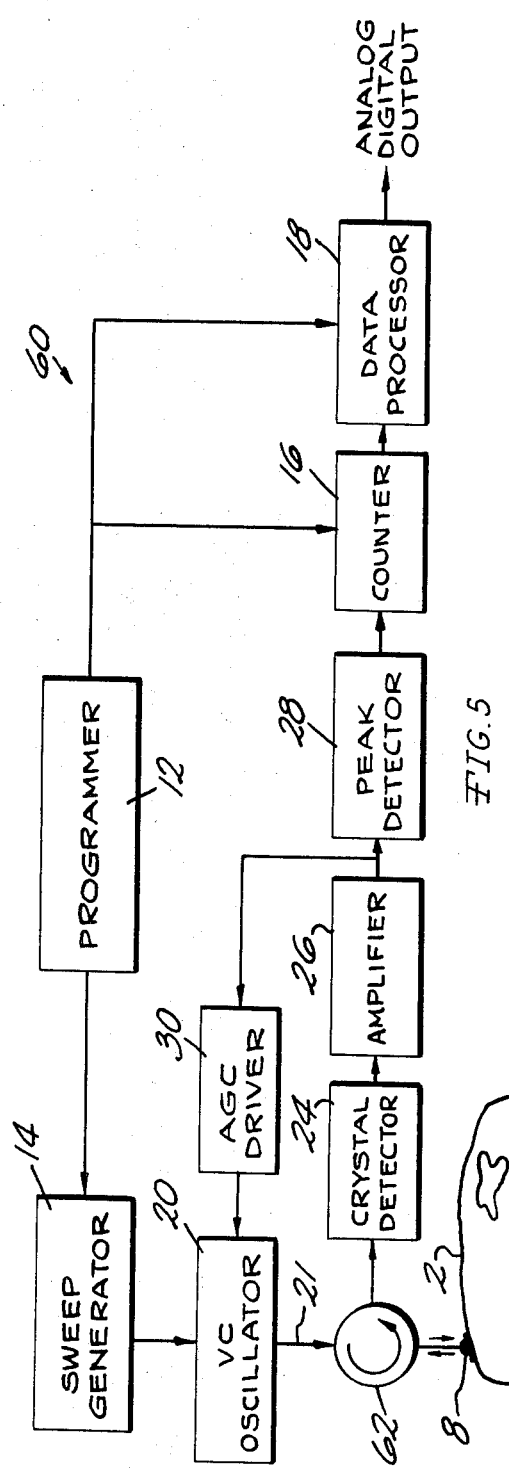
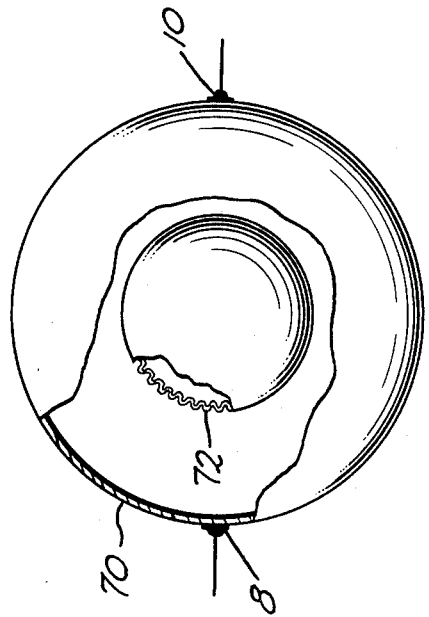
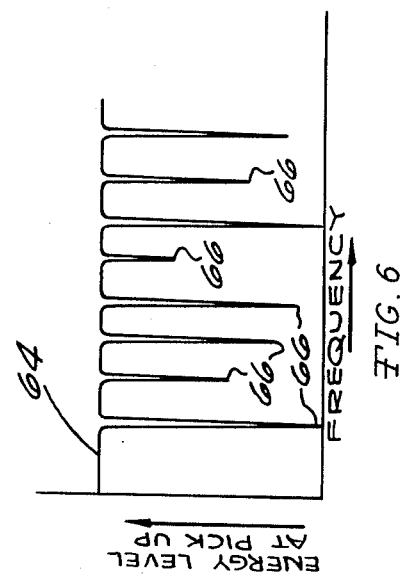
INVENTOR
ROBERT E. POST
ROBERT G. BROWN
BY
ATTORNEY United States Patent Office 3,540,275
Patented Nov. 17, 1970

3,540,275
METHOD AND APPARATUS FOR MEASURING LIQUID VOLUME IN A TANK
Robert E. Post and Robert G. Brown, Ames, Iowa, assignors to The Bendix Corporation, a corporation of Delaware
Filed Feb. 28, 1968, Ser. No. 708,908
Int. Cl. G01f 23/28
U.S. Cl. 73—290
9 Claims

ABSTRACT OF THE DISCLOSURE

A method and apparatus for measuring, under space vehicle conditions, the mass of a preselected liquid in a partially filled rigid tank also containing a preselected gas wherein a predetermined frequency band of electrical signals is introduced into the tank containing the liquid and gas and a number representative of the number of modes of resonant oscillation which are produced in the tank by the electrical signals is determined.

BACKGROUND OF THE INVENTION

Field of invention

The liquid-vapor interface configuration in a partially filled tank under normal gravity forces is definable because it is a configuration perpendicular to the gravity vector. To measure liquid quantity under these normal gravity conditions it is only necessary to locate this interface by means of floats, cavity resonant techniques or any other well known means to determine the quantity of liquid in the tank.

The random geometric shapes which may be assumed by liquids in space vehicles when subjected to space vehicle acceleration environments preclude the use of conventional liquid level quantity gauging systems in most applications. Some of the factors which affect gauging systems for liquid containing rigid walled tanks in space vehicles are: (a) the effect of tank size and shape, (b) environmental conditions such as acceleration, vibration, temperature, pressure, radiation, etc., (c) the method of liquid or vapor withdrawal, (d) the rate at which the liquid may be withdrawn from the tank, (e) the physical and electrical properties of the liquid and the gas in the void volume, and (f) the effect of other tank instrumentations.

The ideal liquid mass gauging system for space environment should have the following characteristics. (a) Each molecule of the liquid should have a uniform influence on the measurement irrespective of its location grouping and irrespective of temperature and pressure variations. (b) The time rate of change of molecular distribution of the liquid must not influence the measurement (i.e., the measuring means must be as near instantaneous as possible). (c) The measurement must be insensitive to all other tank and environmental parameter variations.

If all these criteria are to be met, the measurement cannot be gravity dependent and this eliminates many of the present methods of measuring liquid mass.

Description of the prior art

In addition to the many well known conventional liquid level sensing systems, a zero gravity system is shown in U.S. Pat. 3,312,107. The system disclosed therein employs a sweep frequency oscillator which provides a swept frequency over a desired band frequency beginning with a start frequency. The sweep is interrupted and started over again each time resonant frequency is detected. This cycle is continuously repeated and the time intervals between sweep cycles is used to indicate the quantity of liquid in the tank. Such apparatus is based on the premise that the resonant frequency of a metallic cavity containing a dielectric liquid changes as a function of the amount of dielectric present in the cavity. However, it has been found that the resonant frequency also changes when the orientation of the dielectric liquid in the tank is changed. Consequently, a system which depends on a correlation between resonant frequency and volume of dielectric liquid is subject to being inaccurate under environmental conditions in which the orientation of the liquid in the tank is subject to change.

SUMMARY OF THE INVENTION

A given metallic cavity containing a given mass of a dielectric liquid has a number of resonant frequencies or modes in a given band of frequencies. It has been found that when the cavity is swept over this same band, the number of mode changes as a function of the mass of dielectric liquid present in the cavity. According to this invention, therefore, the number of modes is counted for each sweep over the same band of frequencies to obtain the mass of liquid in the tank, the number of modes being dependent of the orientation of the liquid in the tank. When the dielectric liquid is a lossy dielectric, namely a liquid which dissipates electromagnetic energy, the modes are more difficult to count with presently available signal detection equipment. In such cases, therefore, a number representative of the number of modes is obtained, without actually counting the modes, but the same method is utilized since the representative number is in all cases proportional to the actual number of modes.

A tank containing liquid has an average dielectric constant that varies between its average constant when the tank is full and the average constant when the tank is empty. The number of modes of oscillation which may be set up in the tank is dependent upon the average dielectric constant of the mixture of liquid and gas in the tank and on the frequency range of excitation. Over a selected frequency band, the number of modes which can be excited is a function of the average dielectric constant of the tank void. Since the average dielectric constant varies directly with the density of the liquid in the tank, the number of modes decreases as the mass of liquid in the tank is decreased.

More particularly, the number of modes excited in a tank by a wave length band extending between two fixed frequency limits $f_1$ and $f_2$ is determined by the expression:

$$N = \frac{8\pi V}{3C^3}(f_2{}^3 - f_1{}^3)E^{3/2}$$

where:

$N$ = number of modes of oscillation excited in the tank
$V$ = volume of tank in cubic centimeters
$C$ = velocity of light in free space
$E$ = the average dielectric constant of the total contents of the tank cavity.

Thus the number of modes produced varies as the cube of the frequency. Therefore, electrical exciting energy can be conserved by using a frequency band properly selected for the volume of the tank and the dielectric constant variation of its contents.

Since $f_1$ and $f_2$ are known for a given frequency band, the mode count N can be used to determine E which in turn is representative of the mass of the liquid in the tank. As a result, data processor equipment can be programmed for a given tank and a given liquid to convert mode counts directly to the mass of fluid in the tank.

As an example, if the interior of a rectangular tank having dimensions of 25 cm. x 25 cm. x 100 cm. and filled with air, is excited with electrical signals in the frequency band of 8 to 9 gigacycles, a mode count of 1,750 is obtained. When this tank is filled with a fluid having a dielectric constant of 2 there are 3,220 modes over the 8 to 9 gigacycle frequency band. Thus, there is a difference of 1,470 modes in the 8 to 9 gigacycle band between the empty and full tank conditions.

The mode counting system of this invention is advantageous because it is usable with any metallic tank including irregularly shaped tanks and tanks with internal baffles, changes in the liquid-gas interface geometry within the tank do not affect the mode count, it operates during liquid loading or withdrawal and is external to the tank except for the mounting of one or more probes on the tank.

The apparatus of this invention includes a radio frequency energy source which can be varied in frequency through a predetermined band width. The frequency band is selected on the basis of tank geometry and content dielectric constant. A sweep voltage generator is used to control a voltage controlled oscillator to produce the input signals. The sweep time across the frequency band will be controlled by a programmer. The radio frequency energy is coupled to the tank, and a signal amplitude detector is used to detect the resonance modes. The output from the detector is amplified and used to drive a peak detector circuit which in turn is connected to an electronic counter. The electronic counter is used to count the number of modes in the band. The information from the counter is held in a data processor which is programmed to indicate the mass of the liquid in the tank.

Further objects, features and advantages of this invention will become apparent from a consideration of the following description, the appended claims, and the accompanying drawings in which:

FIG. 5 is a schematic block diagram of the circuit in another form of the apparatus of this invention;

FIG. 6 is a typical RF mode pattern obtainable with the apparatus shown in FIG. 5; and FIG. 7 is an elevational view of a metallic bladder type tank illustrating the application of the apparatus of this invention thereto to measure liquid content.

DESCRIPTION OF THE PREFERRED EMBODIMENT

Figure 1:
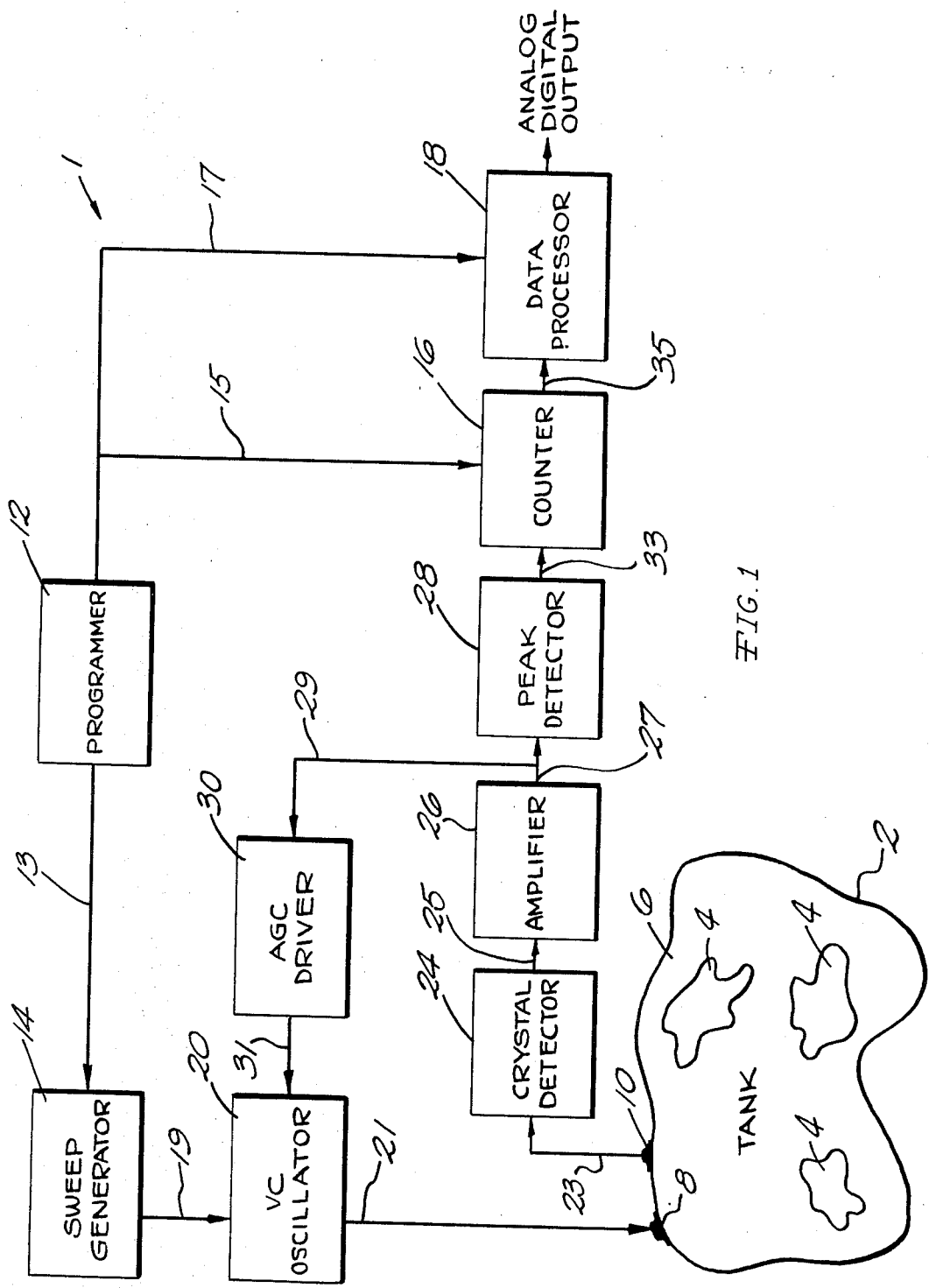
FIG. 1 is a schematic block diagram of the circuit in one form of the apparatus of this invention.

With reference to the drawing, the circuit apparatus of this invention, indicated generally at 1, is shown in FIG. 1 in operative relation with a tank 2 which may be of any desired configuration, an irregular shape being shown for illustrative purposes. The liquid within the tank 2, indicated at 4, may be in separated volume or in continuous volume of any configuration. A gas propellant medium 6 within the tank fills the entire tank volume other than that being taken up by the liquid.

A programmer 12 is the control circuit for the apparatus. It sends a signal through a line 13 to sweep generator 14 and also a control signal through a line 15 to a counter 16. The programmer 12 also sends a signal through a line 17 to a data processor 18 to assure synchronization between the sweep generator 14, the counter 16 and the data processor 18. In other words, programmer 12 correlates recycling of generator 14 and counter 16 so that a mode count is obtained for each sweep cycle. The sweep generator 14 generates a sawtooth voltage wave, the synchronization of which is controlled by the programmer 12. The sweep generator 14 feeds a voltage signal through the line 19 to the voltage controlled oscillator 20 to determine the frequency range of the voltage controlled oscillator 20 as well as its sweep cycle through this frequency range. The selected frequency band output from the oscillator 20 (which is normally one octave) is fed through the line 21 to an excitation probe 8 mounted on the tank 2. The probe 8 introduces into the propellant tank cavity a variable frequency electrical signal, the frequency sweep of which has been predetermined by control of the oscillator 20. When the tank cavity is excited with electrical energy at a frequency different from any of the resonant frequencies of the cavity, the electromagnetic field intensity will be extremely small. However, when the excitation is at a resonant frequency, electromagnetic energy can be stored in the cavity. The maximum amplitude of the electromagnetic field intensity occurs, therefore, when the frequency of the exciting source equals one of the resonant frequencies of the tank cavity. Resonant frequencies or modes are thus readily detected.

Figure 2:
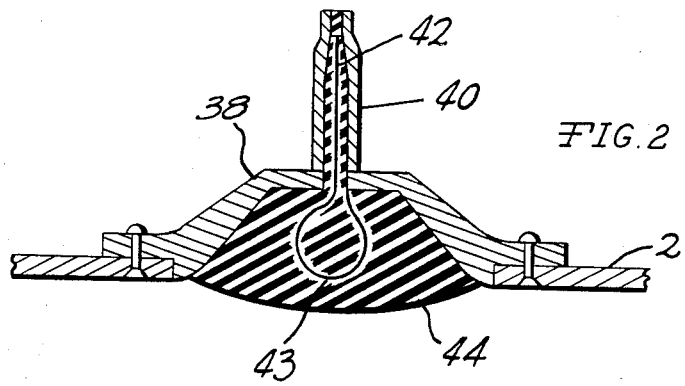
FIG. 2 is a sectional view through the tank in the apparatus of this invention showing a signal probe which can be used for either signal input excitation or electrical output energy pickup.

In the system of this invention resonant frequencies in the tank 2 are picked up by an output probe 10 which is identical to the excitation probe 8 and is shown more particularly in FIG. 2. The signal at the output probe 10, which is amplitude modulated by the modes of resonance of the tank, is fed through line 23 to a crystal detector 24. The crystal detector 24 is an amplitude detector which detects the amplitude modulation of the signals received by the probe 10 which are generated by the modes of resonance. The output of the detector is fed through line 25 to amplifier 26 where it is amplified and then fed through line 27 to a peak detector circuit 28, which cooperates with the amplifier 26 to function as a mode detector, and also through line 29 to the automatic gain control circuit 30. The function of the automatic gain control circuit 30 is the control of the amplitude of the signal output from the oscillator 20 to produce a controlled magnitude of the excitation signal. To accomplish this, the circuit 30 feeds a voltage signal through the line 31 to the voltage controlled oscillator 20.

Figure 4:
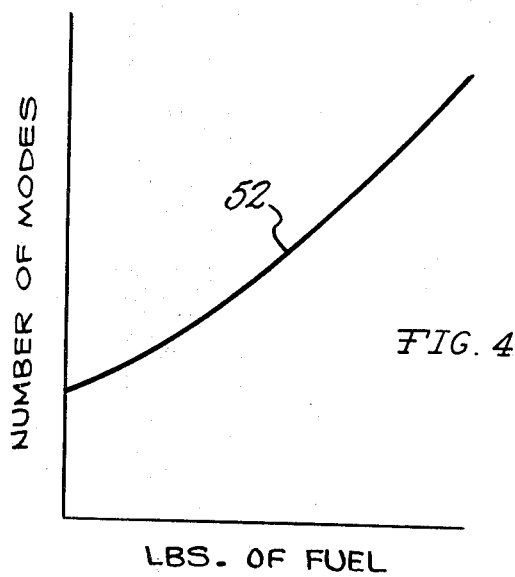
FIG. 4 shows a typical relationship of mass to number of modes for a typical space fuel in a typical tank.

The signal from line 27 goes to the peak detector circuit 28 which has as its function the generation of a trigger pulse for each signal peak so that it will better actuate the counter 16. The pulses from the peak detector circuit 28 are fed through the line 33 to the counter 16 which is also controlled by the programmer 12 through the line 15. The counter therefore counts the pulses which represent the number of resonant modes produced through the frequency range of the sweep cycle. The output of the counter is fed through line 35 to the data processor 18 which is also controlled by the programmer 12 through a line 17. The data processor 18 is calibrated so that its output is a function of the mass of the particular liquid being measured. FIG. 4 shows the relationship, represented by a curve 52, between the number of modes and the pounds of typical fuel in a typical tank for which this data processor was calibrated.

Referring now to FIG. 2, which shows the details of the probes 8 and 10, the wall 38 of the tank 2 has a tubular extension 40 which acts as the outside conductor of a coaxial cable having an inside wire conductor 42.

The conductor 42 is shown terminating in a loop 43, although it can also take the form of a straight probe which acts as an antenna. The antenna 43 is poted in a solid insulating material 44, preferably polytetrafluoride. The antenna 43 acts as an excitation antenna when used in probe 8 and acts as a receiving antenna when used in probe 10.

Figure 3:
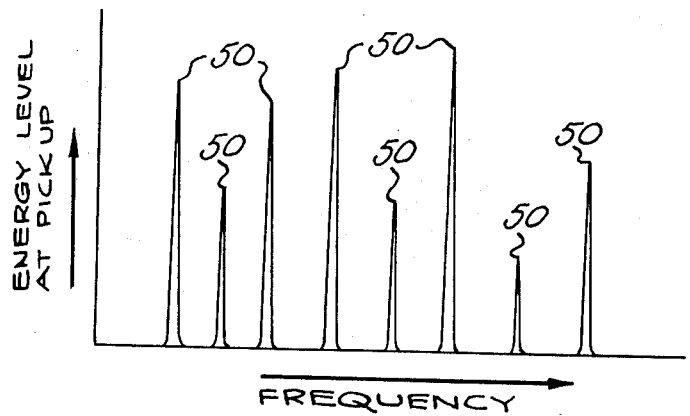
FIG. 3 is a typical RF mode pattern obtainable with the apparatus shown in FIG. 1.

FIG. 3 shows a plot of the output signal modes 50 that are produced for a typical space fuel in a typical tank through a typical frequency range. The peak amplitudes of the modes 50 are not measured but are merely counted to determine the mass of the liquid fuel in the tank. The data processor 18 (FIG. 1) is calibrated in accordance with the applicable curve 52 (FIG. 4) and gives the indication of mass of fuel directly from information received by it in the form of number of modes.

A circuit 60 for carrying out the method of this invention employing a "reflective energy technique" is illustrated in FIG. 5 in assembly relation with the tank 2. Since the circuit 60 is very similar to the circuit 1, like numerals are used in FIG. 5 to illustrate like components in FIG. 1, and only the difference between the circuit 60 and the circuit 1 will be described in detail hereinafter. In the circuit 60, the pickup probe 10 from the circuit 1 is eliminated and the probe 8 functions both as an excitation probe and a detector probe. A three-port circulator 62 is interposed in the line 21 between the oscillator 20 and the probe 8 and is connected to the crystal detector 24.

In the operation of the circuit 60, the cavity in tank 2 is excited with electromagnetic energy over a selected frequency band through probe 8. When the energy is at a frequency different from one of the resonant frequencies of the cavity, substantially all of the energy is reflected back through probe 8 to circulator 62 and the level of this energy is continually detected by crystal detector 24. However, at a resonant frequency electromagnetic energy is stored in the tank cavity so that the level of energy reflected back to the circulator 62 drops and this energy level drop is detected by crystal detector 24.

The energy level detected by detector 24 is illustrated diagrammatically in FIG. 6 where the detected energy level at frequencies other than resonant frequencies is indicated at 64. The resonant modes are indicated by energy level drops 66 which are counted by counter 16 to provide an indication of liquid mass in tank 2. Thus the output signal mode plot in FIG. 6 is the inverse of the one shown in FIG. 3, but both circuits 1 and 60 provide the same end result, namely, a mode count.

The method and apparatus of this invention can also be used to determine the changing volume of a metallic enclosure which contains a variable volume of metallic material. This is illustrated in FIG. 7 in which a metallic tank is indicated at 70 containing a metallized bladder 72 containing a fluid. The bladder 72 changes size as the volume of fluid therein is varied to thus change the volume of tank 70 which is not occupied by the bladder 72. The probes 8 and 10 in circuit 1 are connected to tank 70 as shown in FIG. 7 and the oscillator 20 is used to produce swept frequency signals over a selected band to excite the tank cavity. Resonant modes generated in the tank 70 during each frequency sweep are detected and counted by the circuit 1 as before described. Each change in the volume of tank 70 unoccupied by the bladder 72 will result in a different mode count, thereby enabling calibration of data processor 18 to indicate either volume of tank 70 or volume of fluid in bladder 72. This would also be the case if the tank 70 were partially filled directly with a metallic liquid such as mercury in which case the circuit 60 would be used to indicate by the mode counting system, the volume of mercury in the tank 70.

It can thus be seen that according to the present invention a metallic tank cavity is excited with electromagnetic energy at frequencies extending over a selected range to set up resonant modes of oscillation which can be counted, the resulting mode count being variously useful. A probe picks up the signal output of the tank which is in the form of an amplitude modulated signal, the amplitude variation being caused by the modes of oscillation. This signal is detected and used to trigger a counter circuit to count the number of amplitude variations or modes produced during a sweep across the frequency range by the voltage controlled oscillator. The number of modes is fed into a data processing circuit to transpose this count into the information desired in each case. Thus, by use of the present invention, an electrical signal may be introduced into a tank containing an unknown quantity of a liquid and a gas and with the relationship between number of modes and tank contents known, the number of modes may be counted and transposed in liquid content information. In the case of some dielectric liquids, the dielectric polarizability changes with temperature change. In such case a conventional temperature sensitive element can be added to the tank 2 in a manner to provide a constant indication of the temperature of the liquid therein. The element is then connected to the data processor 18 so as to modify the output thereof to provide a direct indication of liquid mass, otherwise the indication is liquid volume.

What is claimed is:

1. Apparatus comprising means forming an enclosed metallic cavity, means connected to said cavity forming means for exciting said cavity with electromagnetic energy at a swept frequency extending over a preselected frequency range which is removed from the fundamental resonant frequency modes of said cavity, and means connected to said cavity forming means for detecting and counting the number of resonant modes in said cavity in said preselected frequency range.

2. Apparatus according to claim 1 wherein said means for exciting said cavity includes sweep oscillator means for cyclically producing output signals that regularly change over said preselected frequency range, and means connected to said sweep oscillator means for introducing said output signals into said cavity.

3. Apparatus according to claim 2 wherein the means for detecting said resonant modes includes pickup means connected to said cavity forming means in a spaced relation with said means for introducing said output signals into said cavity.

4. Apparatus according to claim 2 further including means responsive to the magnitude of the signals in the resonant modes controlling the magnitude of said output signals from said sweep oscillator means.

5. Apparatus according to claim 1 in which said means for detecting and counting the number of resonant modes in said cavity includes signal amplitude detector means and a counter circuit connected to said detector means so as to count the number of detector output signals generated.

6. Apparatus according to claim 1 further including programming circuit means operatively connected to said means for exciting the cavity and said means for counting the number of modes of resonant oscillation for control and synchronization thereof.

7. Apparatus according to claim 1 wherein said last mentioned means includes a crystal detector, peak detector circuit means connected to said crystal detector so as to receive the output signals therefrom and operable to generate a pulse for each peak in said output signal from said detector, and counter means connected to said peak detector means for counting the pulses received therefrom.

8. The method of measuring the mass of a liquid in a metallic tank, said method comprising the steps of:
(a) exciting the interior of said tank with a preselected frequency range of electrical signals which range is removed from the fundamental resonant frequency modes of said tank, and (b) counting the number of modes of resonant oscillation produced in said tank by said signals.

9. Apparatus comprising means forming an enclosed metallic cavity, means connected to said cavity forming means for exciting said cavity with electromagnetic energy at a swept frequency extending over a preselected frequency range, means connected to said cavity forming means for detecting and counting the resonant modes in said cavity in said swept frequency, said means for exciting said cavity including sweep oscillator means for cyclically producing output signals that regularly change over said preselected frequency range, and means connected to said sweep oscillator means for introducing said output signals into said cavity, said means for detecting said resonant modes includes circulator means interposed between and connected to said sweep oscillator means and said means for introducing said output signals into said cavity, said circulator means being operative to transmit electromagnetic energy reflected back from said cavity through said means for introducing said output signals into the cavity.

References Cited
UNITED STATES PATENTS

| | | |
|---|---|---|
| 3,241,368 | 3/1966 | Newitt. |
| 3,312,107 | 4/1967 | Burns et al. |

FOREIGN PATENTS

| | | |
|---|---|---|
| 1,037,162 | 8/1958 | Germany. |

S. CLEMENT SWISHER, Primary Examiner